(12) United States Patent
Kenney et al.

(10) Patent No.: US 8,165,814 B2
(45) Date of Patent: Apr. 24, 2012

(54) NEUTRALLY BUOYANT SENSOR APPARATUS AND METHOD FOR MAPPING A WATER PATHWAY

(75) Inventors: Joshua Douglas Kenney, San Antonio, TX (US); Ronald Nelson McGinnis, Jr., San Antonio, TX (US); Gregory Charles Willden, San Antonio, TX (US); Ben Allen Abbott, San Antonio, TX (US); Ronald Thomas Green, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 347 days.

(21) Appl. No.: 12/386,792

(22) Filed: Apr. 23, 2009

(65) Prior Publication Data

US 2010/0274488 A1    Oct. 28, 2010

(51) Int. Cl.
*G01V 1/00* (2006.01)
*G06F 19/00* (2011.01)

(52) U.S. Cl. ......... 702/5; 702/2; 702/6; 702/12; 702/16; 367/38

(58) Field of Classification Search ............... 702/12, 702/16, 2, 5, 6; 367/38
See application file for complete search history.

(56) References Cited

OTHER PUBLICATIONS

Green et al. "SwRD IRD 2008—Development of Neutrally Buoyant Sensors for Tracing Conduits in Karst Aquifiers, 20-R9707."—Apr. 2, 2007.*
Gabrielson et al. "A simple neutrally buoyant sensor for direct measurement of particle velocity and intensity in water." Apr. 1995.*

* cited by examiner

*Primary Examiner* — Sujoy Kundu
(74) *Attorney, Agent, or Firm* — Navarro Huff PLLC; Arthur I Navarro

(57) ABSTRACT

An apparatus and method for mapping a water pathway. A group of sensors can be employed for detecting one or more features associated with the water pathway in a direction of flow through the water pathway. A buoyant vessel maintains the sensors, and the sensors assist in compiling data indicative of the detected features. The velocity in the direction of flow through the water pathway can be then determined based on data indicative of the detected feature(s). A mapping of the water pathway can be thereafter generated utilizing the velocity with respect to the features detected by the sensors.

6 Claims, 8 Drawing Sheets

NEUTRALLY BUOYANT SENSOR APPARATUS AND METHOD FOR MAPPING A WATER PATHWAY

TECHNICAL FIELD

Embodiments are generally related to sensing technologies. Embodiments also relate in general to the field of buoyant sensors. In addition, embodiments relate to the mapping of aquifers and geological formations.

BACKGROUND OF THE INVENTION

Knowledge of the locations and properties of conduits is valuable when managing the water resources of karst aquifers. In spite of the large reliance on karst aquifers for water resources, assessment tools appropriate for characterizing karst aquifers are inadequate and inferior when compared with similar tools developed for porous-media-type aquifers, such as sand and gravel or sandstone reservoirs. In particular, groundwater modeling tools developed for porous media-type aquifers cannot accommodate both the rapid flow of groundwater through conduits, and the slow flow and storage of groundwater in the matrix of karst aquifers. Understanding the geometry of karst conduits has been a difficult task. In order to accurately construct groundwater models, researchers must know the full extent of these features.

Conventional prior art methods used to directly characterize karst conduits include tracer tests (Alexander, E. C., Jr. and J. F. Quinlan. 1992. Practical Tracing of Ground Water, with Emphasis on Karst Terrains. Geological Society of America, Boulder, Colo. Volume 2, pp. 195 & 133), and mapping by cave divers (Lauritzen, S-E., J. Abbott, R. Arnessen, G. Crossley, D. Grepperud, A. Ive, and S. Johson, 1985. Morphology and Hydraulics of an Active Phreatic Conduit Cave Science 12. pp. 139-146). Dye tracer studies, while useful for determining flow velocities in a system, do not accurately characterize the size and complexity of karst conduits. Mapping karst conduits through the use of cave divers is both costly and dangerous. In addition, cave mapping is limited to: (i) conduits large enough for divers to access, (ii) conduits with flow velocities low enough to be safely navigated by a diver, and (iii) reasonable depths and distances.

A need thus exists for an inexpensive means of measuring and recording the morphology and flow characteristics of a karst conduit while traversing a karst conduit between an accessible launch and recovery site. A means and method of sensing, measuring and recording karst conduit flow velocity, path traveled, and conduit dimensions would provide numerous advantages.

SUMMARY OF THE INVENTION

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved sensor apparatus.

It is another aspect of the present invention to provide for an improved buoyant sensor.

It is a further aspect of the present invention to provide for a buoyant sensor for the mapping of aquifers and geological formations and conduits.

The aforementioned aspects and other objectives and advantages can now be achieved as described herein. An apparatus and method are disclosed for mapping a water pathway. A group of sensors can be employed for detecting one or more features associated with the water pathway in a direction of flow through the water pathway. A buoyant vessel maintains the sensors, and the sensors assist in compiling data indicative of the detected features. The velocity in the direction of flow through the water pathway can be then determined based on data indicative of the detected feature(s). A mapping of the water pathway can be thereafter generated utilizing the velocity with respect to the features detected by the sensors.

The disclosed approach can be utilized to autonomously map pathway, flow velocity, and dimensions as they flow through a karst conduit. A sensor equipped with sonar and magnetometer instrumentation can be utilized to characterize water pathway such as a semi-saturated conduit in of an aquifer. Sonar is also utilized to capture the cave dimensions and the velocity of flow. A magnetometer measures the orientation of the conduit path taken by the sensor. Together, such data can be utilized to provide an accurate reproduction of the oriented morphology of the conduit. The sensors are dynamically buoyant to enable the sensors to negotiate around obstacles and avoid stalling.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
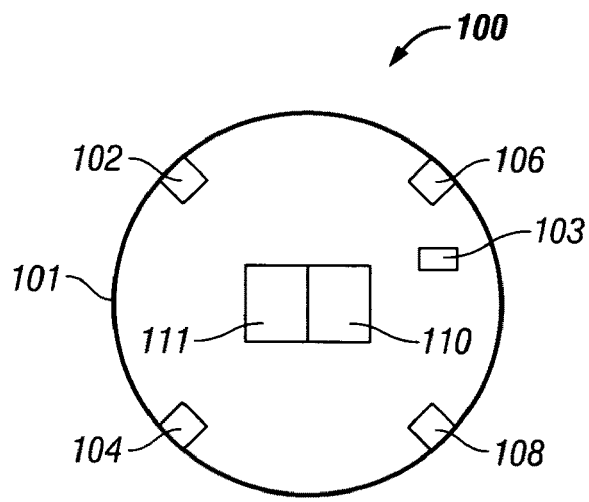
FIG. 1 illustrates a plan view of a Neutrally Buoyant Sensor (NBS) apparatus that can be implemented in accordance with an embodiment.
Figure 2:
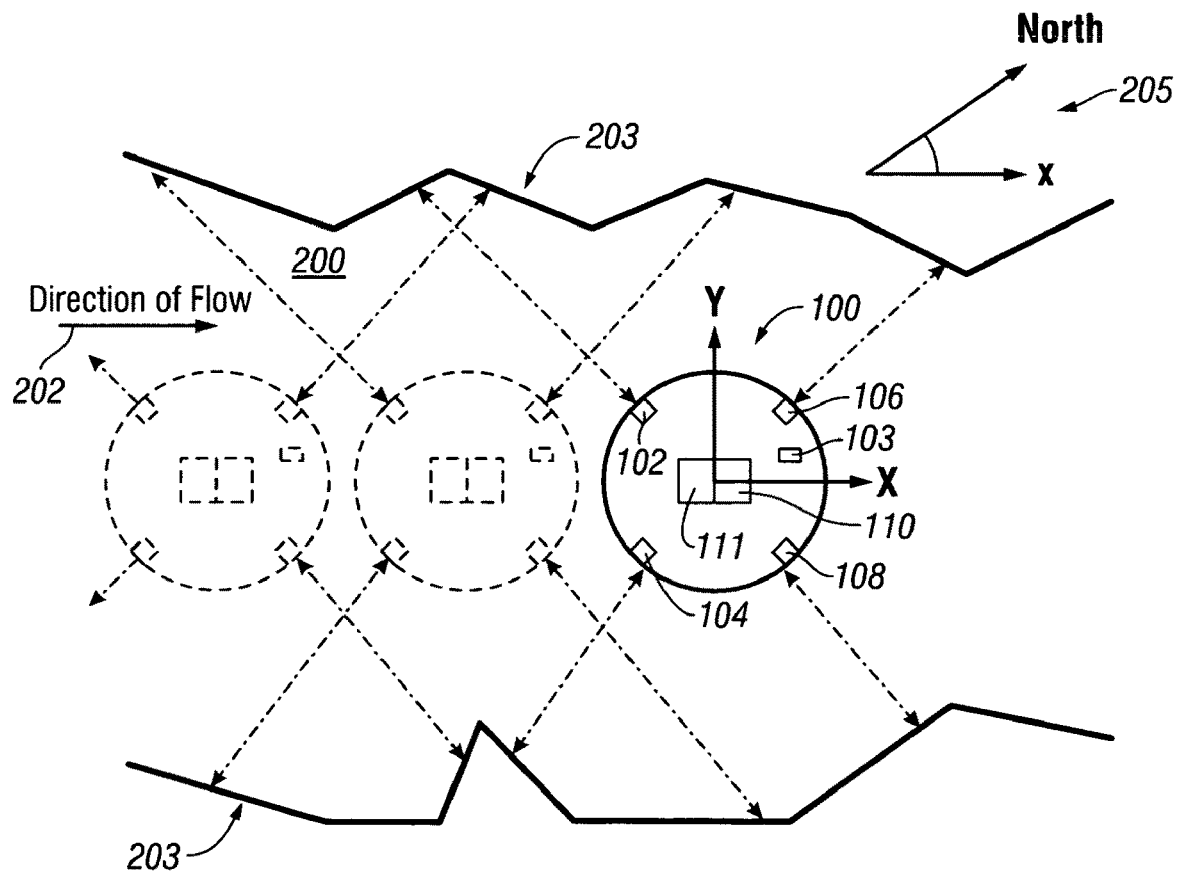
FIG. 2 illustrates a plan view the sensor apparatus within a conduit with respect to the direction of flow, in accordance with an embodiment.

FIG. 1 illustrates a plan view of a Neutrally Buoyant Sensor (NBS) apparatus 100 that can be implemented in accordance with an embodiment. FIG. 2 illustrates a plan view the sensor apparatus 100 within a conduit 200 with respect to the direction of flow 202, in accordance with an embodiment. Note that in FIGS. 1-13 herein, identical or similar parts or elements are generally indicated by identical reference numerals. The apparatus 100 can be configured to include a magnetometer 110 that senses offset data from magnetic north as indicated by the directional axis key shown in FIG. 2. The magnetometer 110 may be implemented as a dual-axis magnetometer. Co-located or associated with the magnetometer 110 is an accelerometer 111, which can be configured as a dual-axis accelerometer capable of detecting sudden movement(s).

The apparatus 100 further includes one or more sonar ranging devices 102, 104, 106, and 108 that provide sonar ranging for determining the distance to conduit geometry. Apparatus 100 additionally can include a thermometer 103 that provides the temperature of surrounding water. The apparatus 100 further includes a housing or shell 101 that surrounds or protects the magnetometer 110, the accelerometer 111 and associated electronic components, such as the thermometer 103 and sonar ranging devices 102, 104, 106, and 108. Such sonar ranging devices 102, 104, 106, 108 may be, for example, ultrasonic transducers. The shell 101 is depicted in FIG. 1 with a generally circular outline, but it can be appreciated that shell 101 can be preferably configured with a spherical shape. Note that the shell 101 can function essentially as a vehicle that moves through the conduit 200.

The apparatus 100 is capable of being assembled utilizing commercially available components, such as, for example, ultrasound sensors, dual-axis magnetometers, accelerometers, and the like. A general purpose wireless senor node (not shown in FIGS. 1-2) with an onboard processor (not shown in FIGS. 1-2) and a memory unit (not shown in FIGS. 1-2) can coordinate the overall operation of the data collection components, such as the thermometer 103, the sonar ranging devices 102, 104, 106, 108, the magnetometer 110, and the accelerometer 111. The magnetometer 110 can be utilized to gauge the orientation relative to magnetic north, while the accelerometer 111 can determine motion dynamics (i.e., furnishing a form of inertial navigation) as the apparatus 100 travels through one or more conduits. One or more ultrasonic transducers, such as the sonar ranging devices 102, 104, 106, 108 can be employed to characterize the geometry of conduit 200 and, ultimately, velocity. For example, sonar ranging devices 102, 104, 106, and/or 108 can be utilized to determine the shape or geometry of the conduit walls 203 of the conduit 200 in which the apparatus 100 travels in the direction of flow indicated by arrow 202.

Figure 3:
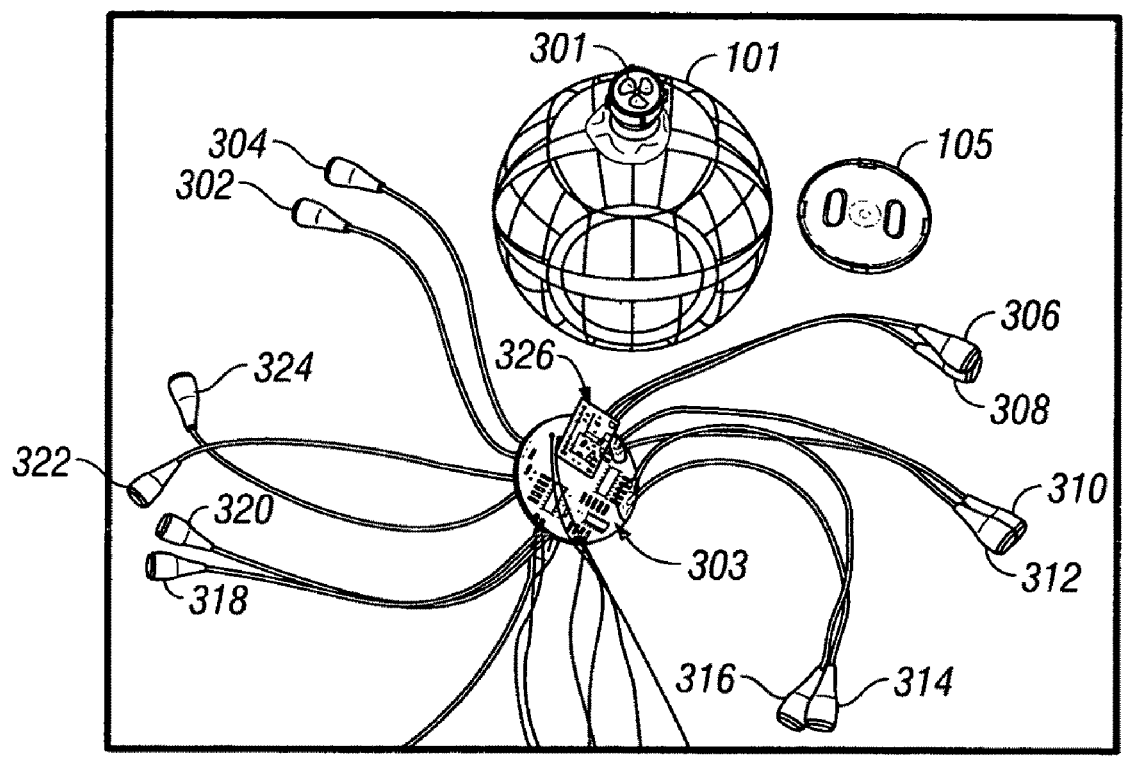
FIG. 3 illustrates a pictorial representation of the sensor apparatus equipped with a propeller, in accordance with an embodiment.

FIG. 3 illustrates a pictorial representation of the sensor apparatus 100 equipped with a propeller 301, in accordance with an embodiment. In the example depicted in FIG. 3, six pairs of ultrasonic transducers 302, 304; 306, 308; 310, 312; 314, 316; 318, 329; and 320, 322 are shown as generally positioned on each axis around the circular vessel or shell 101 to emit sonar "pings" outwards to the conduit walls 203 (FIG. 2). As shown, cap 105 can be secured to shell 101 to form a suitable vessel for a sensor apparatus, such as sensor apparatus 100. The ultrasonic transducers 302, 304; 306, 308; 310, 312; 314, 316; 318, 320; and 322, 324 as depicted in FIG. 3 are generally analogous to the sonar ranging devices 102, 104, 106, and/or 108 of FIGS. 1-2. Each pair of ultrasonic transducers 302, 304; 306, 308; 310, 312; 314, 316; 318, 320; and 322, 324 can be configured with a transmitter, which transmits ultrasound pulses normal to a sensor node, and a receiver, which records the reflected ultrasound pulse. The magnetometer 110, the accelerometer 111, and a processor/microprocessor can be located at the location 326 depicted in FIG. 3.

Accurate distances to the surrounding conduit 200 features can be determined utilizing the time of arrival of the reflected pulses. The reflected pulses can be calibrated based on the density of water and air. Sonar ranging provides a representative characterization of the geometry of conduit 200. The rate of displacement of distinctive wall features can be utilized in the context of velocity calculations. Post-processing of the data from all components enables the calculation of real-time velocity of the apparatus 100 as it travels along the patent of conduit 200, as well as calculation of the shape and size of the conduit 200.

The orientation (i.e., magnetometer 110) data can be utilized in combination with the sonar readings to detect features, derive velocity, and to ultimately unravel the data into a chain of vectors corresponding to the path taken, velocity profile, and measured shape of the conduit 200. Similarly, the floating sonar coordinates can be rectified to Cartesian position and distributed to the respective vector segment. Accelerometers, such as, for example, accelerometer 111, can be utilized to detect if any periods of rapid movement occur since these could adversely affect the triangulation used in mapping.

Figure 4A:
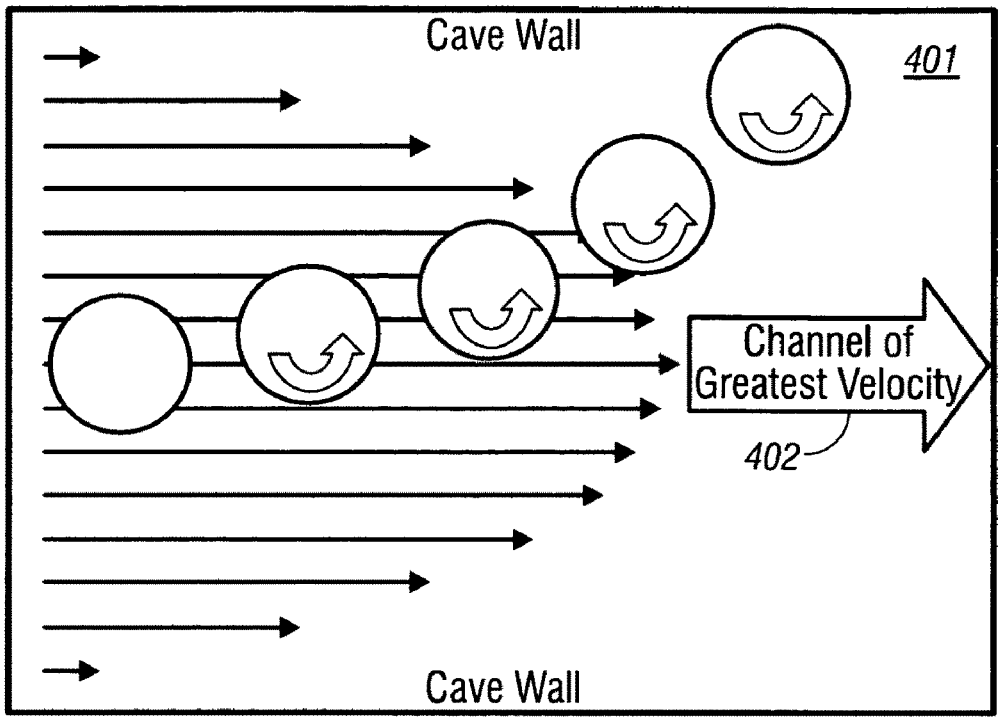
FIGS. 4(a) and 4(b) respectively illustrate the tendency for spherical sensors to float toward cave walls and stall and the intended effect of attaching a fin to spherical sensors to overcome their tendency to flow toward cave walls and stall.
Figure 4B:
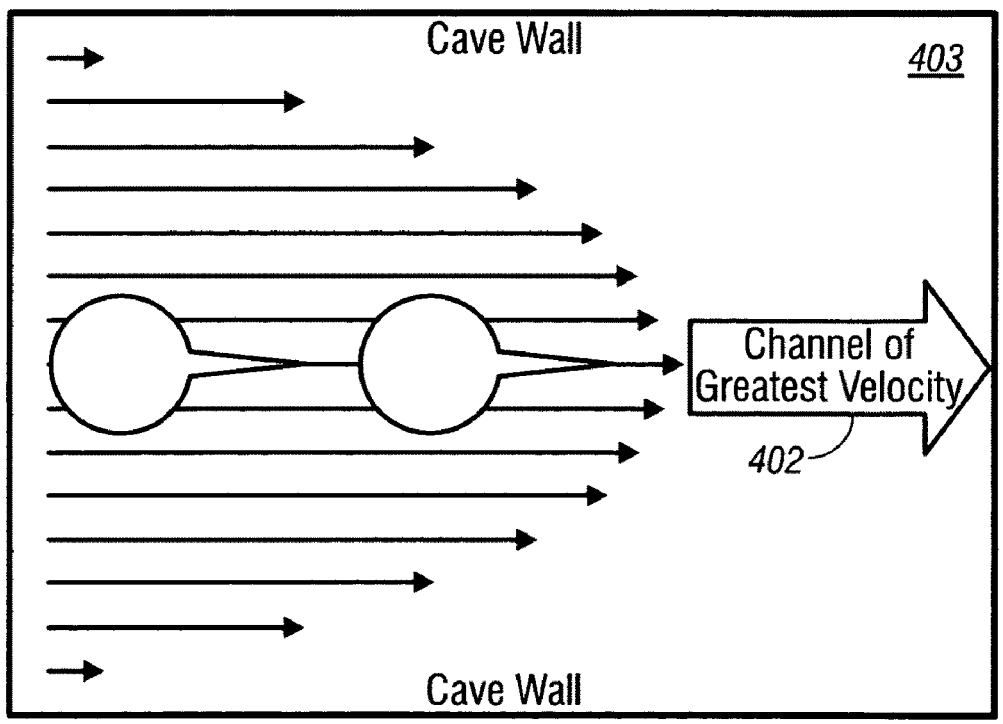

FIGS. 4(a) and 4(b) respectively illustrate the tendency for spherical sensors to float toward cave walls and stall (see graph 401 of FIG. 4(a)) and the intended effect of attaching a fin to spherical sensors to overcome their tendency to flow toward cave walls and stall (see graph 403 of FIG. 4(b)). In FIGS. 4(a) and 4(b), the channel of greatest velocity is indicated be arrow 402.

Following free air (hallway) tests, a submersible prototype of sensor 100 was constructed. Off-the-shelf through-hole electronic components were used along with a printed circuit board to construct the main circuitry of the unit. The ultrasonic sensors (e.g., sonar ranging devices 102, 104, 106, and 108) were mounted through the surface of a spherical vehicle (e.g., shell/vessel 101) and connected to the printed circuit board via coaxial cabling. For convenience, the resulting assembly was housed in a relatively large, clear hard plastic ball procured from a local pet supply store (i.e., a 22-cm diameter hamster ball). For subsequent deployments, a hobby submarine motor and control circuitry were added to provide dynamic mobility of the ball to navigate conduit terrain.

The first generation of the prototype NBS was field tested in Spring Creek Cave in Tex. on Dec. 1, 2007. This deployment showed that spherically shaped vehicles tended to drift out of the main flow channel and become trapped at the cave wall. This is attributed to forces associated with conventional velocity gradients in conduit flow as depicted in FIGS. 4(a)

and 4(b). Three sensors were deployed approximately 300 m upstream from the cave mouth, but none traveled more than 30 m over two-days.

The second generation of NBS was modified to avoid the trapping phenomenon. Three sizes of sensor vehicles (i.e., balls) were evaluated to determine what size and shape would minimize sensor rotation. Their shapes were modified by adding a fin to prevent them from stalling at the cave walls (see FIGS. 4(a) and 4(b)).

Attachment of the fin reduced the rotation and impeded the tendency of the sensors to rotate out of the flow field (see FIGS. 4(a) and 4(b)). It was also determined that the NBS's need to be weighted such that they remain upright to maintain the fins at the most effective horizontal orientation. In addition, having the NBS oriented in the upright position allows for simpler data processing and eliminates likely uncertainties.

Figure 5:
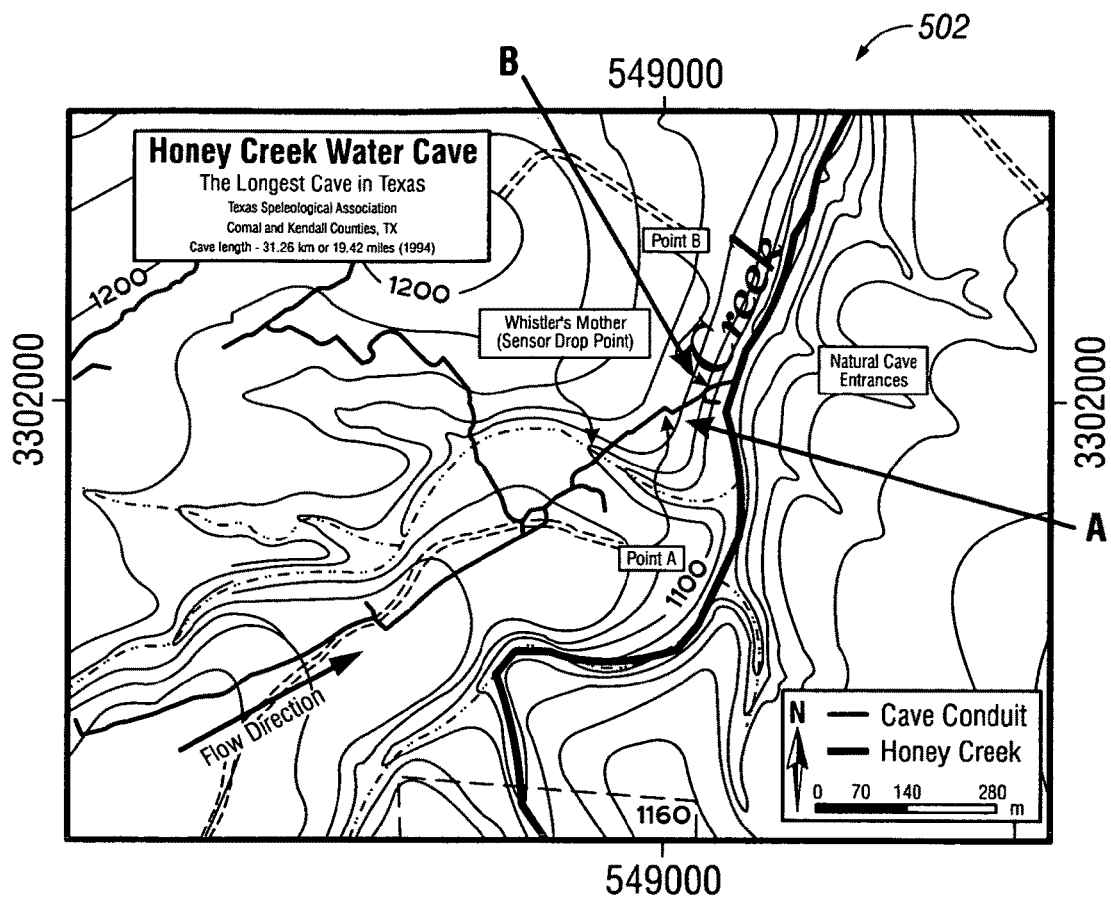
FIG. 5 illustrates a topographical map with the location of a cave network and a general map thereof.
Figure 5:
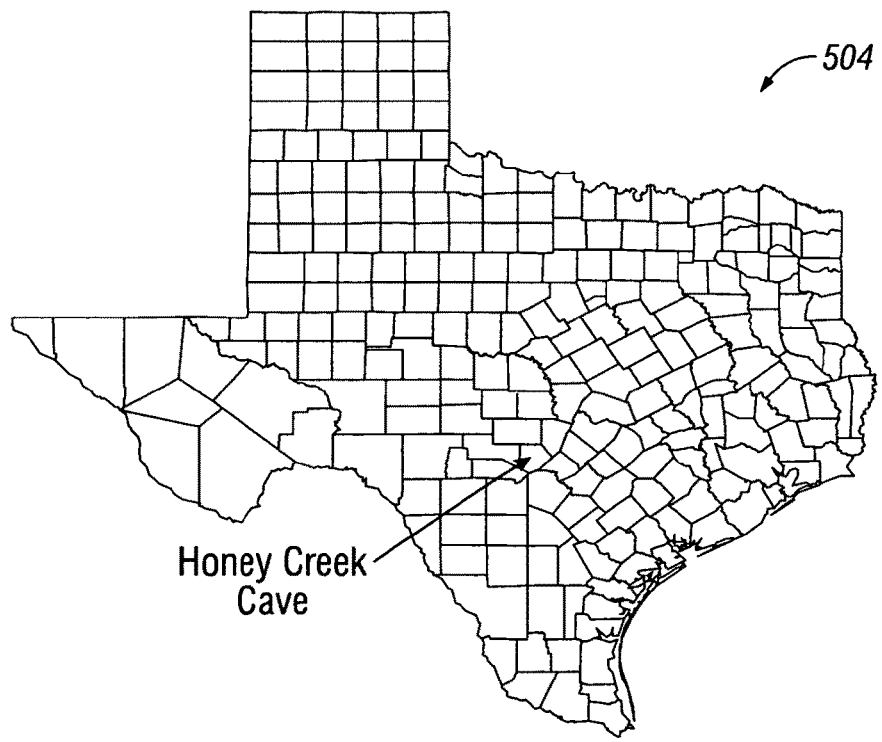

FIG. 5 illustrates a topographical map 502 with the location of a cave network and a general map 504 thereof. The second generation of sensors was field tested on Apr. 12, 2008 in Honey Creek Cave located approximately 20 miles northwest of San Antonio, Tex. as indicated by map 504. Under normal flow conditions, the cave is largely (>50% saturation) filled with water, but provides sufficient air space to permit non-scuba exploration. The diameter of the cave varies between 5 and 8 m, and the average water depth is approximately 3 m. To determine the effect of size and fin on the vehicle behavior, a total of 36 non-instrumented plastic Wiffle Balls® and 17 buoyant golf balls were simultaneously deployed about 300 m upstream from the outlet of Honey Creek Cave. The 10-cm diameter Wiffle Balls® and the 5-cm diameter golf balls were outfitted with fins and weighted to make them approximately neutrally buoyant. The test vehicles were retrieved approximately 48 hours after deployment. Eleven of 36 Wiffle Balls® and all 17 golf balls were found within 5-10 m downstream from the point of deployment at the surface of the water and next to the cave walls.

A single Wiffle Ball® was retrieved at the water surface approximately 100 m from the point of deployment (Point A in map 502 of FIG. 5) trapped by a stalactite. A subsequent trip to recover the additional test vehicles was necessary because the depth at the drop point and the poor visibility after the cave sediment was disturbed required diving equipment. This second trip took place four days after release; 23 Wiffle Balls® were retrieved from the floor of the cave at the point of deployment. At the same time, one Wiffle Ball® was retrieved at the water surface approximately 120 m downstream from the point of deployment, also near Point A in FIG. 4. The last Wiffle Ball® was retrieved at the water surface on July 3, 170 m downstream from the point of deployment (Point B in map 502 of FIG. 5).

Although the ballast (i.e., weights) attached to each ball was selected to make the balls neutrally buoyant at a depth of approximately 30 cm below the water surface, none of the balls successfully achieved neutral buoyancy. The balls either floated to the surface or sank to the floor of the cave. Those balls that sank did not move after resting on the floor of the cave. Most of the balls that floated at the surface became trapped by cave features (i.e. shelves, stalactites).

The outcome of the second deployment illustrated the challenges of achieving static neutral buoyancy and navigating features in conduits. As a result, the sensor assembly was modified to be dynamically buoyant to assess whether this capability could mitigate the tendency of the sensors to stall at cave walls or hang up on ceiling protrusions (e.g., stalactites). Sensor mobility was achieved by attaching a small motorized propeller (e.g., propeller 301) to the outside bottom of the sensor shell, such as the shell 101. The propeller was programmed to engage at preset time intervals. Each cycle consisted of 30 seconds to drive the sensor vertically down, followed by two seconds of "off" time and five seconds of reverse rotation (to drive the sensor vertically up to overcome any eventuality of the sensor becoming embedded in mud or silt on the cave floor), and followed by 60 seconds of "off" time during which the propeller was not engaged. This sequence of propeller engagements was designed to avoid the sensor becoming detained by down hanging protrusions or becoming stalled at cave walls. This was not true depth control; rather, in this case, the sensor was set to float at slightly positive buoyancy, and the propeller simply pulled it down for the short periods. Alternative approaches for depth control could utilize a form of piston and ballast system, but the cost and fabrication time tradeoffs would need to be considered. In such a case, live processing of sonar readings might prove to be of further help. The propeller-based method seems to have the advantage of slightly moving the sensor thereby helping the sensor get free from some traps.

The third NBS deployment occurred at Honey Creek Cave on Jul. 3, 2008 to observe whether the propeller system gave improved mobility. Three instrumented NBS's equipped with propellers were deployed at several locations between Whistlers Mother (see map 502 of FIG. 5) and the cave outlet over the course of six hours. This series of deployments were conducted to observe whether the new functionality enabled the sensors to navigate past restrictions in the flow regime that had proved to be impediments during earlier deployments of static neutrally buoyant prototypes. Although the three sensors were designed to be slightly positively buoyant, attaining this precise level of buoyancy was not achieved. Nevertheless, the transport trajectory was sufficiently long and uninterrupted to allow collection of ultrasound, magnetometer, and accelerometer data of a 20 m-long stretch of Honey Creek Cave.

Data from the Jul. 3, 2008 deployment in Honey Creek Cave were collected to ascertain the ability to remotely characterize a wet cave (i.e., karst conduit). The reduction of sonar and magnetometer data is discussed in the following sections. As expected, accelerometer data provided by the low-cost devices utilized have proven insufficiently sensitive to allow for an "inertial navigation" type of analysis. For this reason, the focus has been on geometry-based navigation utilizing the compass and sonar readings.

Figure 6:
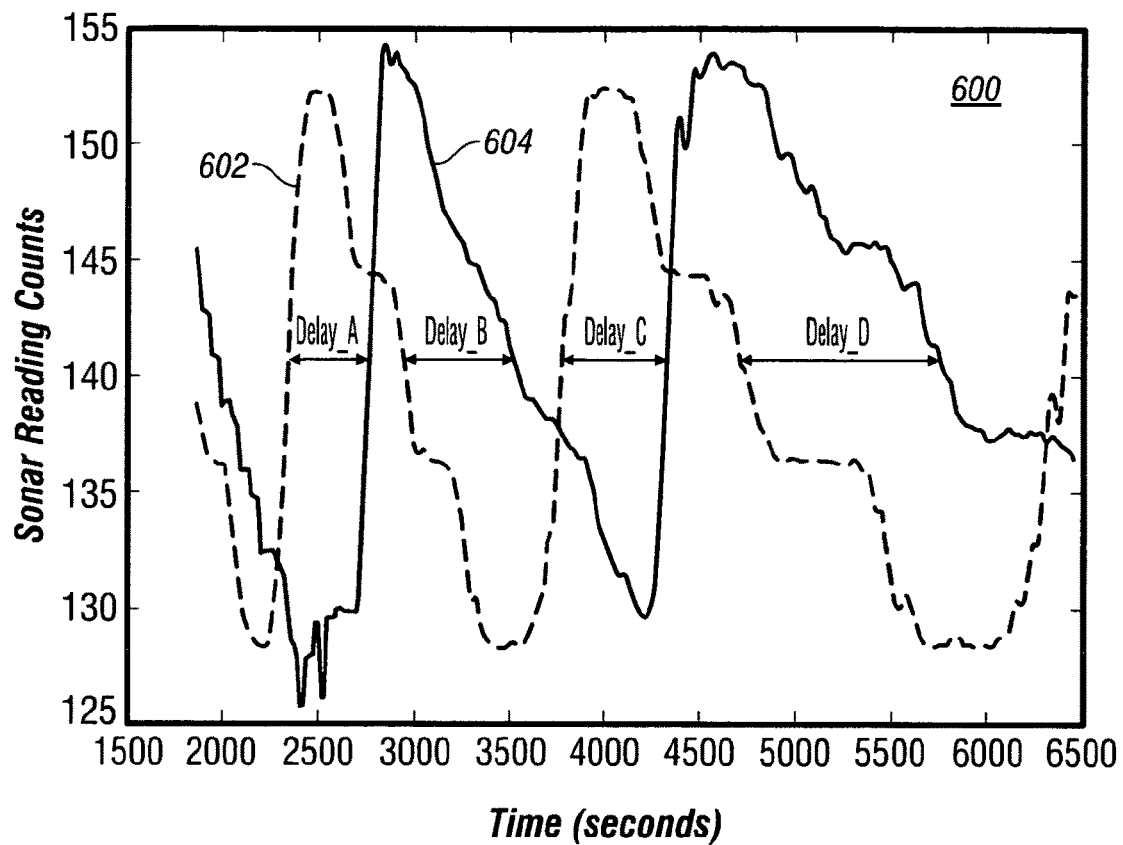
FIG. 6 illustrates a graph depicting relative sample delays between features detected using the front and rear sensors, in accordance with an embodiment.

FIG. 6 illustrates a graph 600 depicting relative sample delays between features detected using the front (line 602) and rear (line 604) sensors, in accordance with an embodiment. The first step in the reduction of sonar data is to calculate the velocity of the apparatus 100 along the conduit flow path (magnetometer readings can be folded in follow-up steps). This process includes cross-correlating the front and rear sonar signals on both sides of the sensor apparatus 100 to determine the relative sample delays between detected features. For example, characteristic features in forward-right and rearward-right sensors show a delay indicative of the time to pass particular features. Magnetometer readings can be used to prove that the ball is actually staying oriented in a consistent direction (this can be accomplished by quick analysis of the magnetometer reading trace) and not simply rotating. Due to the physics of the water flow and the resulting forces, placing a tail on the ball helps this become the preferred mode of travel.

Figure 7:
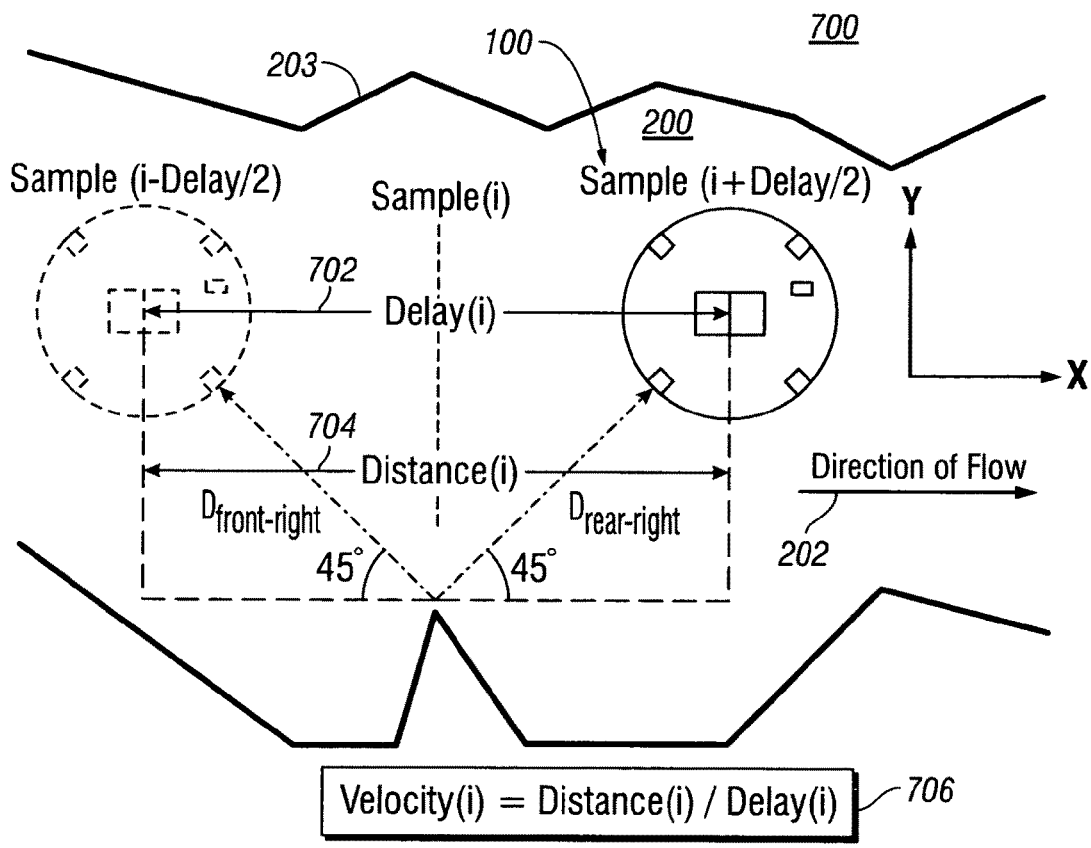
FIG. 7 illustrates a graphical representation of the geometric calculation of sensor velocity using distance and delay, in accordance with an embodiment.

FIG. 7 illustrates a graphical representation of the geometric calculation of sensor velocity using distance and delay, in accordance with an embodiment. As a reminder, in FIGS. 1-13 herein, identical or similar parts or elements are generally indicated by identical reference numerals. Thus, the conduit 200 is shown in FIG. 7, along with the sensor apparatus 100 and a direction of flow indicated by arrow 202. FIG. 7 indicates that a digital signal processing operation using a correlation for each sample can be made over time windows. Delay and distance are respectively indicated in FIG. 7 by arrows 702 and 704. Additionally, a box 706 provides an equation for calculating velocity.

Centering the delay window (i.e., where "window" means a small group of samples in a region) around each sample, the distance window (distance itself is based on the time of response to the ping, i.e., the speed of sound in water) was calculated using the front sonar reading for the first sample of the window and the rear sonar reading for the last sample of the window. This geometry of the calculation is illustrated in FIG. 7. Dividing the distance by the delay, the velocity at each sample was determined via the equation depicted at box 706. The first and last windows of the sample were smoothed to the average velocity of the nearest known sample.

Figure 8:
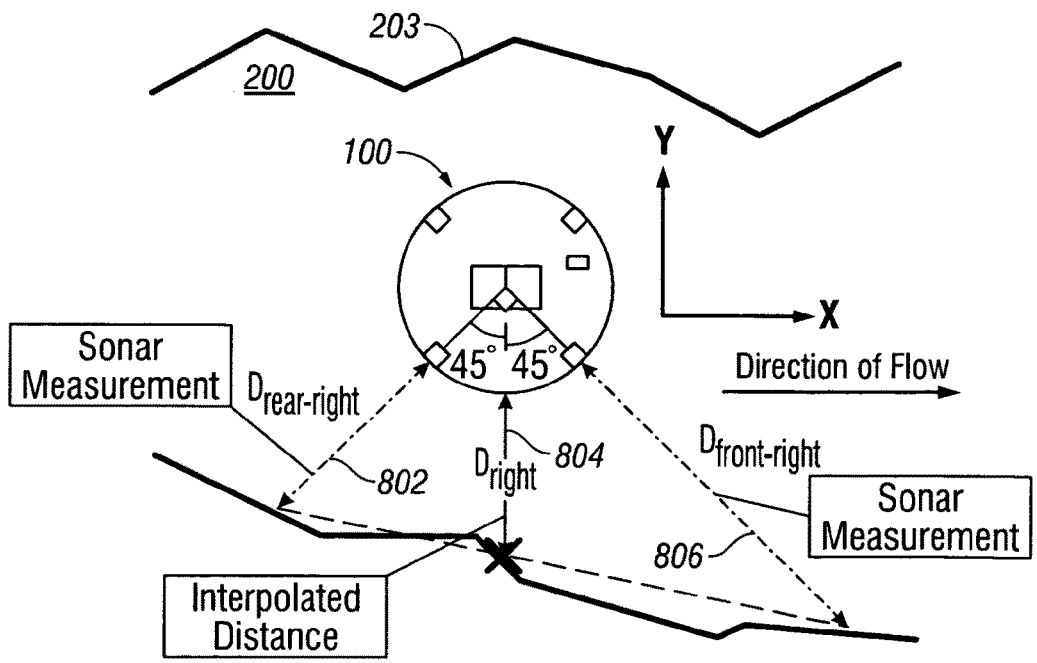
FIG. 8 illustrates a graphical representation of the calculation of the approximated shortest distance between the sensor and conduit wall, in accordance with a an embodiment.

FIG. 8 illustrates a graphical representation of the calculation of the approximated shortest distance between the sensor 100 and conduit wall 203, in accordance with one embodiment of the invention. For each sample, the front and rear sonar readings can be used to calculate the normal distances to each side of the conduit as illustrated in FIG. 8. In FIG. 8, sonar measurement is generally indicated by dashed line 802. The interpolated distance is generally represented by line 804. Sonar measurement is also indicated in FIG. 8 by line 806. The top and bottom sample pairs were similarly processed to determine the instantaneous distances to the ceiling and floor of the conduit, respectively. Preliminary distances can be converted to final distances using calibrations based on lab tests and basic constants for the speed of sound in water.

Figure 9:
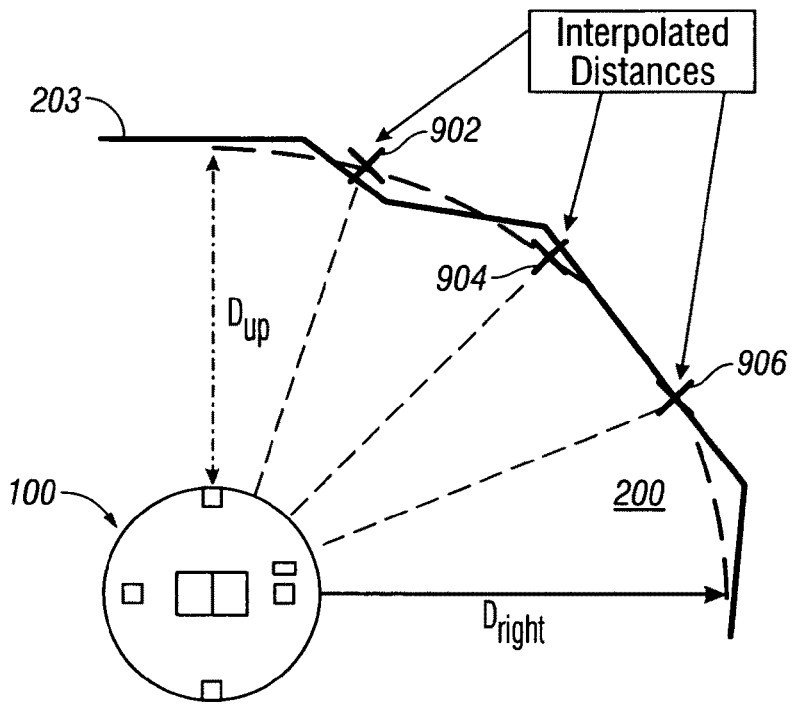
FIG. 9 illustrates a graphical representation of "Up" and "right" estimated distances to compose a conduit cross section, in accordance with an embodiment.

FIG. 9 illustrates a graphical representation of "Up" and "right" estimated distances to compose a conduit cross section, in accordance with an embodiment. Assuming a smooth (quasi-elliptical), cross sectional geometry for the conduit, passage cross sections were compiled using a linear interpolation (by angular displacement) between orthogonal distance estimates 902, 904, and 906. An approximation of 45 degrees between the sonar readings can be utilized to assume a perpendicular distance to the wall 203 of the conduit 200. More elegant processing is possible but does not significantly add to the overall system accuracy. Further, this approximation avoids the need for sensor readings to be perfectly orthogonal to each other.

Figure 10:
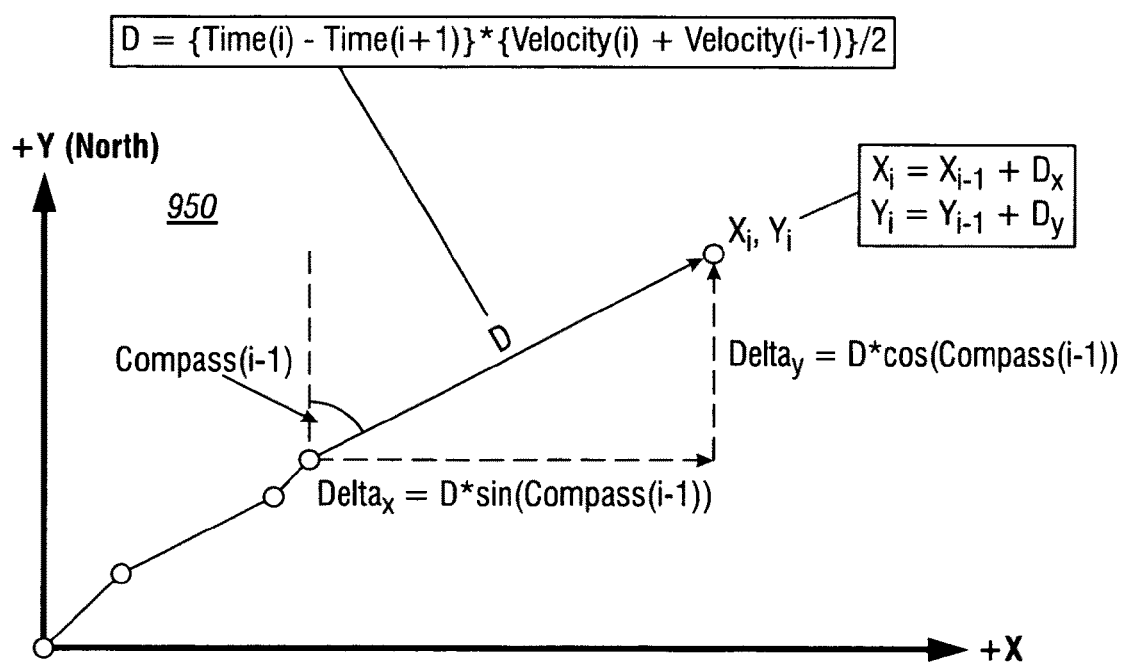
FIG. 10 illustrates a graph indicating the calculation of an actual path taken by sensor using magnetometer heading data and sonar velocity date, in accordance with an embodiment.

FIG. 10 illustrates a graph 950 indicating the calculation of an actual path taken by sensor 100 using magnetometer heading data and sonar velocity date, in accordance with an embodiment. Magnetometer data can be reduced by converting the X-axis and Y-axis magnetometer readings (these are the inherent magnetic field values created by this form of sensor) to compass bearings at each time increment. Using these compass headings as well as the previous velocities that were calculated for each data sample in the sonar data, the X-Y path taken by the sensor node can be determined, as illustrated in FIG. 10. Obviously, fast water and a spinning sensor could cause this method to fail; but the tail and the slow speeds along with a verification that the sensor did not spin throughout conduit traversal (based on magnetometer readings) allows the processing to assume the sensor generally follows a path parallel to the conduit.

Figure 11:
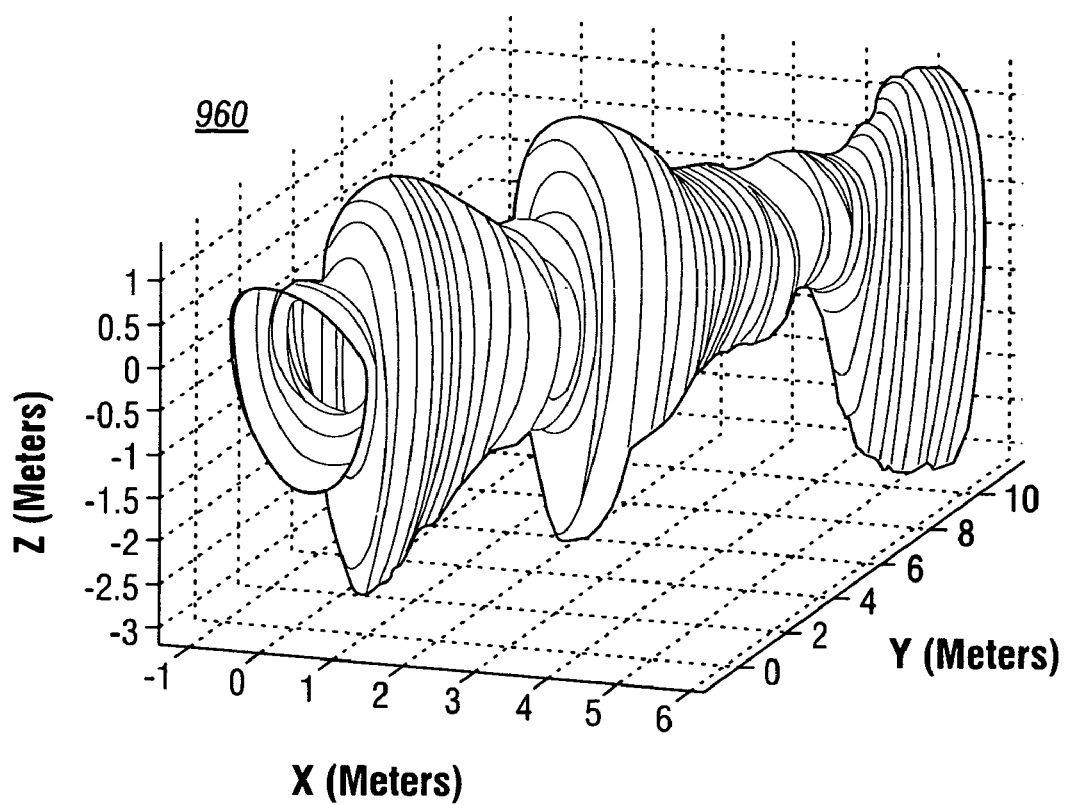
FIG. 11 illustrates an example graph depicting a final rendering of a cave passage using collected sonar and magnetometer data, in accordance with an embodiment.

FIG. 11 illustrates an example graph 960 depicting a final rendering of a cave passage using collected sonar and magnetometer data, in accordance with an embodiment. Graph 960 thus represents conduit characterization. That is, local distances to the conduit walls 203 can be applied at each position of the apparatus 100 to obtain a three-dimensional conduit map rendered using, for example, MATLAB plotting functions.

Figure 12:
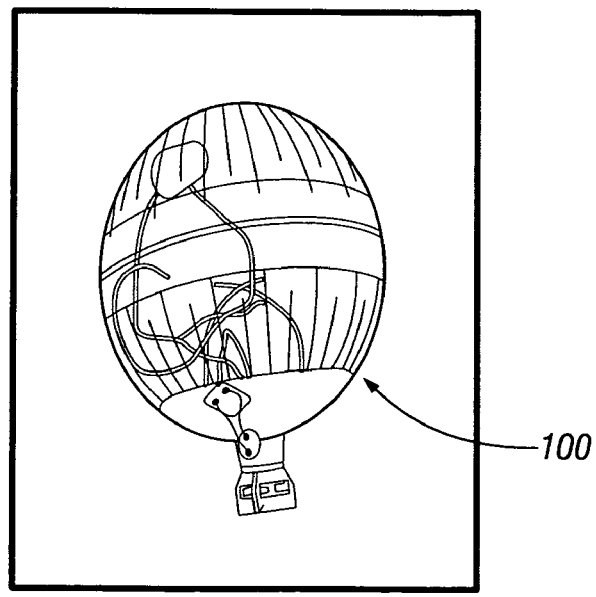
FIG. 12 illustrates a pictorial view of sensor in an aquatic environment within a conduit, in accordance with an embodiment.

FIG. 12 illustrates a pictorial view of sensor 100 in an aquatic environment within a conduit, in accordance with an embodiment. The prototype of apparatus 100 depicted in FIG. 12 was tested under various laboratory and field settings (as described above) to demonstrate and assess their capabilities. Field testing was performed at the Spring Creek Cave and Honey Creek Cave near San Antonio, Tex. Sensor sizes tested were 4 cm (i.e., golf ball size), 8 cm (i.e., softball size), and 22 cm (i.e., small soccer ball size) in diameter, although they could be made much smaller.

Three wet cave deployments were used to field test the prototype NBS's. The first deployment was in Spring Creek Cave (Dec. 1, 2007) and the next two deployments were conducted in Honey Creek Cave (Apr. 12 and Jul. 3, 2008). The analysis of data collected during the Jul. 3, 2008, Honey Creek Cave deployment is described in the "Data Analysis" section above.

Apparatus 100 was developed generally to autonomously map the pathway, flow velocity, and dimensions of a karst conduit. Several generations of sensors were required to overcome challenges created by the flow dynamics of wet caves or conduits. Precise attainment of static neutral buoyancy proved to be problematic. Sensors with static buoyancy tended to either float at the water surface or sink to the cave floor. This experience led to the decision to pursue dynamic buoyancy to enable the sensors to avoid stalling at cave walls or becoming lodged against impediments protruding into caves (i.e., stalactites). The integrated analysis of sonar and magnetometer data collected in a field setting suggests that this approach successfully characterized a segment of a partially saturated karst conduit (i.e., Honey Creek Cave). Sonar data proved to be effective in determining the cave dimensions and the velocity of flow. The magnetometer data were used to orient the pathway taken by the sensor. Together, these data provided a representative reproduction of the oriented morphology of a wet cave. It is believed that such types of data have not been collected in this manner to date.

Based on the foregoing, it can be appreciated that the aforementioned sensor 100 offers a number of advantages. One advantage involves the use of sonar data to determine velocity based on features detected. Typically sonar velocity measurements do not utilize features but simply use rate of change of distance. Another advantage involves the use of mobility for not only depth control but also for avoiding traps. This has not been accomplished for small floating sensor platforms. An additional advantage involves the integration of multiple attritable sensors in a single low-cost package for mapping water pathways. Still, a further advantage involves the use of neutrally buoyant sensor platforms for mapping water pathways.

Sensor apparatus 100 can be utilized to autonomously map pathway, flow velocity, and dimensions as they flow through a karst conduit. A sensor equipped with sonar and magnetometer instrumentation was successfully used to characterize a 20 m segment in Honey Creek Cave, a semi-saturated conduit in south-central Texas. Sonar proved to be effective in capturing the cave dimensions and the velocity of flow. A magnetometer was used to measure the orientation of the conduit path that was taken by the sensor. Together, these data provided an accurate reproduction of the oriented morphology of the conduit. The sensors were developed to be dynamically buoyant to enable the sensors to negotiate around obstacles and avoid stalling.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of mapping a water pathway comprising:
   at least one buoyant sensor having a plurality of sensor components including an accelerometer and a magnetometer which compile data indicative of at least one detected feature associated with said water pathway;
   a processor determining a velocity in a direction of flow through said water pathway, wherein said velocity is based on said data indicative of said at least one detected feature;
   a processor generating a mapping of said water pathway utilizing said velocity with respect to said at least one detected feature; and
   wherein said accelerometer detects an abrupt movement of said buoyant sensor within said water pathway and said magnetometer detects an offset from a magnetic north orientation in said direction of flow.

2. The method of claim 1 further comprising:
   a plurality of ultrasonic transducers detecting said at least one detected feature associated with said water pathway in said direction of flow by sonar ranging; and
   wherein said accelerometer detects an abrupt movement of said buoyant sensor within said water pathway and said magnetometer detects an offset from a magnetic north orientation in said direction of flow, wherein said plurality of ultrasonic transducers together with said accelerometer and said magnetometer generate said data indicative of said at least one detected feature associated with said water pathway.

3. The method of claim 1 wherein said mapping comprises the step of creating a three-dimensional representation of said water pathway.

4. The method of claim 1 further comprising the step of:
   compiling a front sonar reading and a rear sonar reading via said plurality of sonar ranging devices; and
   calculating normal distances to each side of said water pathway utilizing said front sonar reading and said rear sonar reading.

5. The method of claim 1 further comprising the step of a plurality of sonar ranging devices within said plurality of sensors detecting said at least one detected feature associated with said water pathway.

6. The method of claim 5 wherein further comprising a thermometer within said plurality of sensors detecting the temperature of water within said water pathway.

* * * * *